United States Patent Office 3,407,173
Patented Oct. 22, 1968

3,407,173
POLYOLEFIN COMPOSITION STABILIZED WITH HYDRAZONES
Tsuneto Kuriyama, Chikujyo-gun, and Toshinhiko Kuroda, Shigeru Tanba, and Isao Toshima, Yokkaichi-shi, Japan, assignors to Yoshitomi Seiyaku Kabushiki Kaisha, Osaka-shi, and Mitsubishi Petrochemical Company Limited, Tokyo, Japan
No Drawing. Filed Feb. 5, 1965, Ser. No. 430,729
Claims priority, application Japan, Feb. 14, 1964, 39/7,603
8 Claims. (Cl. 260—45.9)

ABSTRACT OF THE DISCLOSURE

This invention relates to stabilized polyolefin compositions. The present invention has it as an object to provide a polyolefin composition having a high degree of stability against oxidation deterioration remarkably accelerated by the contact of the polyolefin or specifically polypropylene with copper.

---

Polypropylene is so high in the stress-crackproofness, thermoembrittlementproofness, softening point and electric insulation as to be adapted to uses as an electric wire coating material. But the fact that it is so sensitive to the action of heat or light in the presence of oxygen as to be deteriorated and denaturalized is a great obstacle in its expected uses. It is already known to add such additive as an antioxidant of a phenol, amine or sulfur series with a view to improving such deterioration and denaturalization and satisfactory results have been obtained. However, even in the case of stabilization by such known additive as mentioned above, if it is used in contact with copper, its stabilizing effect will markedly decrease and usually it will not be able to substantially improve the deterioration and denaturalization.

The present invention is to provide a polyolefin composition highly stabilized against deterioration by heat oxidation even in the presence of copper.

We have found that, when a small amount of a hydrazone compound is added together with a general stabilizer to a polyolefin, the polyolefin will keep a high degree of stability even in contact with copper, and we have reached the present invention on the basis of this finding.

That is to say, the polyolefin composition of the present invention contains a hydrazone compound having the general formula:

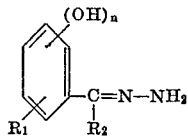

wherein $R_1$ and $R_2$ are hydrogen or same or different hydrocarbon radicals which are substituted or unsubstituted alkyl, cycloalkyl, aryl, alkarly or aralkyl radicals and $n$ is 1 or 2, in an amount of 0.01 to 10%, preferably 0.1 to 3% by weight.

An object of the present invention is to provide a polyolefin composition having a high degree of stability against deterioration by heat oxidation even in contact with copper.

As the hydrazone compounds which may be used in the present invention, there are mentioned 2-hydroxyacetophenone hydrazone, 2,4-dihydroxyacetophenone hydrazone, salicylaldehyde hydrazone, 2-hydroxycaprophenone hydrazone, 2-hydroxydodecaphenone hydrazone, 2,4-dihydroxybenzaldehyde hydrazone and 2,4-dihydroxybutyrophenone hydrazone.

In the polyolefine composition of the present invention, usually the above mentioned hydrazone compound and any of other general stabilizers are both used. Such other stabilizers include all of such stabilizers as, for example, of phenol, amine and sulfur series and such stabilizers to stabilize the polyolefin against deterioration by heat or light oxidation as ultraviolet ray absorbents. Further, such other additives to be mixed to improve the nature of the polyolefin as coloring agents, fillers and carbon can be properly added.

The polyolefin so called in the present invention means a polymer or copolymer of such olefin as ethylene, propylene, 3-methyl-butene-1, pentene-1, 4-methyl pentene-1, 3,3-dimethyl butene-1, 4,4-dimethyl butene-1, octene-1 or decene-1 and a mixture of such polymer and copolymer.

In the present invention, as a method of mixing a component to be added to a polyolefin or a polyolefin composition containing any other additive, it can be uniformly mixed by means of such proper mixer as, for example, a Bambury mixer, rolls or an extruder.

The present invention shall be explained more particularly with reference to an example in the following. However, the present invention should not be restricted by the following example in so far as its subject matter is not exceeded.

Further, the test of deterioration by accelerated oxidation shown in the example was carried out by measuring the time until a remarkable discoloration or crack was observed in the sample at a temperature of 150° C. by means of a TSS gear type ageing tester. Said time is known as an embrittling time.

EXAMPLE

To an isotactic polypropylene powder of an intrinsic viscosity of about 22 in tetraline at 138° C. were added 0.15% 1,1,3-tri(2-methyl-4-hydroxy-5-t-butylphenyl) butane and 0.4% distearyl-3,3'-thiodipropionic acid as antioxidants and each of hydrazone compounds as a copper damage preventive. The thus obtained composition was melted with an extruder and was made pellets.

A sheet 0.5 mm. thick with a copper screen sealed in was made of such pellets at 230° C. with stainless steel pressing plates. A small piece of 3 x 6 cm. was cut off the sheet and was measured. (The copper was exposed in the cross-section.)

For comparison, samples in which the same antioxidants were used but no hydrazone compound was added or no copper screen was sealed, were also measured. The results are shown in the following table.

| No. | Hydrazone compound | Copper screen | Embrittling time (hr.) |
|---|---|---|---|
| 1 | Absent | Absent | 600 |
| 2 | do | Present | 40 |
| 3 | 2-hydroxyacetophenone hydrazone, 0.5% | do | 250 |
| 4 | 2,4-dihydroxycaprophenone hydrazone, 0.5% | do | 190 |
| 5 | 2-dihydroacetophenone hydrazone, 0.5% | Absent | 680 |
| 6 | 2,4-dihydroxycaprophenone hydrazone, 0.5% | do | 630 |

As easily understood from the above table, the polyolefin composition of the present invention has a well improved stability against denaturalization caused by heat and oxygen.

What is claimed is:

1. A polyolefin composition of solid polyethylene, propylene or ethylene-propylene copolymers; containing a stabilizing amount of a hydrazone compound having the general formula:

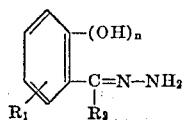

wherein $R_1$ and $R_2$ are hydrogen or same or different hydrocarbon radicals which are substituted or unsubstituted alkyl, cycloalkyl, aryl, arkaryl or aralkyl radicals and $n$ is 1 or 2.

2. A polyolefin composition according to claim 1 wherein said hydrazone compound is used in an amount of 0.01 to 10%, preferable 0.1 to 3% by weight to the polyolefin.

3. A polyolefin composition according to claim 1 wherein said hydrazone compound is 2-hydroxyacetophenone hydrazone.

4. A polyolefin composition according to claim 1 wherein said hydrazone compound is 2,4-dihydroxyacetophenone hydrazone.

5. A polyolefin composition according to claim 1 wherein said hydrazone compound is salicylaldehyde hydrazone.

6. A polyolefin composition according to claim 1 wherein said hydrazone compound is 2-hydroxycaprophenone hydrazone.

7. A polyolefin composition according to claim 1 wherein said hydrazone compound is 2-hydroxydodecaphenone hydrazone.

8. A polyolefin composition according to claim 1 wherein said hydrazone compound is 2,4-dihydroxybutro-phenone hydrazone.

References Cited

UNITED STATES PATENTS

| | | | |
|---|---|---|---|
| 2,757,163 | 7/1956 | Bowers | 260—45.9 |
| 2,786,044 | 3/1957 | Warner et al. | 260—45.9 |
| 3,010,939 | 11/1961 | Dinsberg | 260—45.9 |
| 3,110,696 | 11/1963 | Dexter | 260—45.9 |
| 3,142,658 | 7/1964 | Stewart | 260—45.9 |

DONALD E. CZAJA, *Primary Examiner.*

H. E. TAYLOR, *Assistant Examiner.*